US011381612B2

(12) United States Patent
Sood et al.

(10) Patent No.: US 11,381,612 B2
(45) Date of Patent: Jul. 5, 2022

(54) VOICE OVER LONG-TERM EVOLUTION (VOLTE) CALL NORMALIZATION AND ALERT POLICY SYSTEM

(71) Applicant: T-Mobile USA, Inc., Bellevue, WA (US)

(72) Inventors: Romil Sood, Bothell, WA (US); Nassereddine Sabeur, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/436,776

(22) Filed: Jun. 10, 2019

(65) Prior Publication Data
US 2019/0379711 A1 Dec. 12, 2019

Related U.S. Application Data

(60) Provisional application No. 62/682,536, filed on Jun. 8, 2018.

(51) Int. Cl.
*H04L 65/1096* (2022.01)
*H04M 7/00* (2006.01)
*H04L 65/1069* (2022.01)
*H04W 84/04* (2009.01)

(52) U.S. Cl.
CPC ...... *H04L 65/1096* (2013.01); *H04L 65/1069* (2013.01); *H04M 7/0078* (2013.01); *H04W 84/042* (2013.01)

(58) Field of Classification Search
CPC ............ H04L 65/1096; H04L 65/1069; H04M 15/47; H04M 7/0078; H04W 12/12
See application file for complete search history.

(56) References Cited

U.S. PATENT DOCUMENTS

| | | | | |
|---|---|---|---|---|
| 5,345,595 | A | * | 9/1994 | Johnson .............. H04L 63/1416 455/410 |
| 9,602,552 | B2 | * | 3/2017 | Bakker ............. H04M 1/72418 |
| 2003/0076816 | A1 | * | 4/2003 | Naranjo ................. H04L 45/10 370/352 |
| 2005/0070278 | A1 | * | 3/2005 | Jiang ..................... H04W 8/183 455/432.3 |
| 2009/0191841 | A1 | * | 7/2009 | Edge ................... H04L 65/1016 455/404.1 |

(Continued)

*Primary Examiner* — Syed Ali
(74) *Attorney, Agent, or Firm* — Han Santos, PLLC (57) ABSTRACT

The present disclosure describes techniques that facilitate detecting a Voice over Long-Term Evolution (VoLTE) call request with a recipient call number that lacks a country code. The VoLTE call request may be initiated by a subscriber device while roaming in a VPLMN. Specifically, a Normalization and Alert Policy (NAP) system is described that is configured to analyze the VoLTE call request and determine an intended country code and adjust the recipient call number to include the country code. Further, the NAP system may analyze the adjusted recipient call number to determine whether initiating a VoLTE call in response to the VoLTE call request may trigger an alert condition. An alert condition may relate to determining that the VoLTE call request may initiate a cost-prohibitive VoLTE communication or that the VoLTE call request relates a fraudulent communication.

20 Claims, 5 Drawing Sheets

(56) References Cited

U.S. PATENT DOCUMENTS

| | | | | |
|---|---|---|---|---|
| 2009/0270099 | A1* | 10/2009 | Gallagher | H04W 8/08 455/435.1 |
| 2013/0089025 | A1* | 4/2013 | Titcombe | H04Q 3/0045 370/328 |
| 2015/0264553 | A1* | 9/2015 | Janosi | H04W 8/12 455/433 |
| 2015/0350869 | A1* | 12/2015 | Karshenas Najafabadi | H04W 8/02 455/432.1 |
| 2015/0350983 | A1* | 12/2015 | Kwok | H04W 36/0022 370/331 |
| 2016/0165032 | A1* | 6/2016 | Chang | H04L 67/142 455/566 |
| 2016/0255050 | A1* | 9/2016 | Grayson | H04L 63/1433 726/1 |
| 2018/0184277 | A1* | 6/2018 | Suzuki | H04W 76/10 |
| 2018/0191786 | A1* | 7/2018 | Kunz | H04L 65/1016 |
| 2019/0007788 | A1* | 1/2019 | Russell | H04W 12/12 |
| 2019/0044932 | A1* | 2/2019 | Kumar | H04W 12/121 |
| 2019/0124516 | A1* | 4/2019 | Miranda | H04M 15/59 |
| 2019/0208393 | A1* | 7/2019 | Bakker | H04W 76/50 |
| 2021/0136633 | A1* | 5/2021 | Zetterlund | H04W 36/14 |

* cited by examiner

VOICE OVER LONG-TERM EVOLUTION (VOLTE) CALL NORMALIZATION AND ALERT POLICY SYSTEM

RELATED APPLICATION

This application claims priority to a co-pending, commonly owned U.S. Provisional Patent Application No. 62/682,536 filed on Jun. 8, 2018, and titled "VoLTE Call Normalization and Alert Policy System," which is herein incorporated by reference in its entirety.

BACKGROUND

Telecommunication service providers typically offer wireless communications via a Public Land Mobile Network (PLMN) that is confined to a specific geographic region. A PLMN may comprise of several cellular technologies such as UMTS/3G, Long-Term Evolution (LTE) and 5G-New Radio. Since a PLMN is typically confined to a specific geographic region, subscribers to an HPLMN (i.e. a subscriber's Home PLMN) may initiate voice and text communications that omit a country code, which is generally common across an entirety of the PLMN. Instead, subscribers may use more granular identifiers specific to the HPLMN, such as a national destination code (NDC) or a number planning area (NPA) code.

At times, a subscriber to an HPLMN may initiate a wireless communication, such as a Voice over Long-Term Evolution (VoLTE) call, while roaming within a VPLMN, such as when traveling in a foreign country. In doing so, the subscriber may inadvertently omit the country code when initiating the VoLTE call request. By way of example, a subscriber to an HPLMN may save a phone number of a contact in a non-international format. Thus, if the subscriber initiates a VoLTE call to the contact, while roaming in a VPLMN, the HPLMN may be unable to establish the communicative connection due to being unable to determine whether the contact is associated with the HPLMN or VPLMN (i.e. due to the lack of a country code in the contact phone number).

Therefore, techniques to adjust a recipient call number to include a country code when initiating a VoLTE call from within a VPLMN may help facilitate establishing intended communication connections between a subscriber and their intended recipient.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques to normalize a Voice over Long-Term Evolution (VoLTE) call initiated via a subscriber device while roaming in a Visited Public Land Mobile Network (VPLMN). In one example, the VoLTE call may be intended for a recipient device associated with the HPLMN of the subscriber device. In a second example, the VoLTE call may be intended for a recipient device associated with the VPLMN from which the subscriber device is roaming. In a third example, the VoLTE call may be intended for another VPLMN that is different from the VPLMN that the subscriber device is roaming. In each of these examples, a Normalization Alert Policy (NAP) system may be configured to intercept VoLTE call requests at the Telephone Application Server (TAS) of the Home Public Land Mobile Network (HPLMN) of the subscriber device. In doing so, the NAP system may analyze a recipient number associated with the VoLTE request and further generate an adjusted recipient number by including a country code that was omitted from the recipient number in the VoLTE call request. By way of example, a subscriber to an HPLMN may save a phone number of a contact in a non-international format. Thus, if the subscriber initiates a VoLTE call to the contact, while roaming in a VPLMN, the HPLMN may be unable to establish the communicative connection due to being unable to determine whether the contact is associated with the HPLMN or VPLMN (i.e. due to the lack of a country code in the contact phone number).

Therefore, the NAP system may be configured to include the country code of the HPLMN in response to a determination that the recipient number does not include the country code and that the recipient number is associated with the HPLMN. Alternatively, the NAP system may include the country code of the VPLMN from which the subscriber device is roaming, in response to a determination that the recipient number does not include a country code and that the recipient number is associated with the VPLMN.

Further, the NAP system may be configured to generate a VoLTE call alert to a VoLTE call initiated by a subscriber device while roaming in a VPLMN. The VoLTE call may be intended for a recipient device that is associated with another VPLMN. In the first example, the alert may correspond to the cost of the VoLTE call. In a second example, the alert may correspond to a detection of likely fraud, based on the recipient number associated with the recipient device.

Further, the term "techniques," as used herein, may refer to system(s), method(s), computer-readable instruction(s), module(s), algorithms, hardware logic, and/or operation(s) as permitted by the context described above and through the document.

Figure 1:
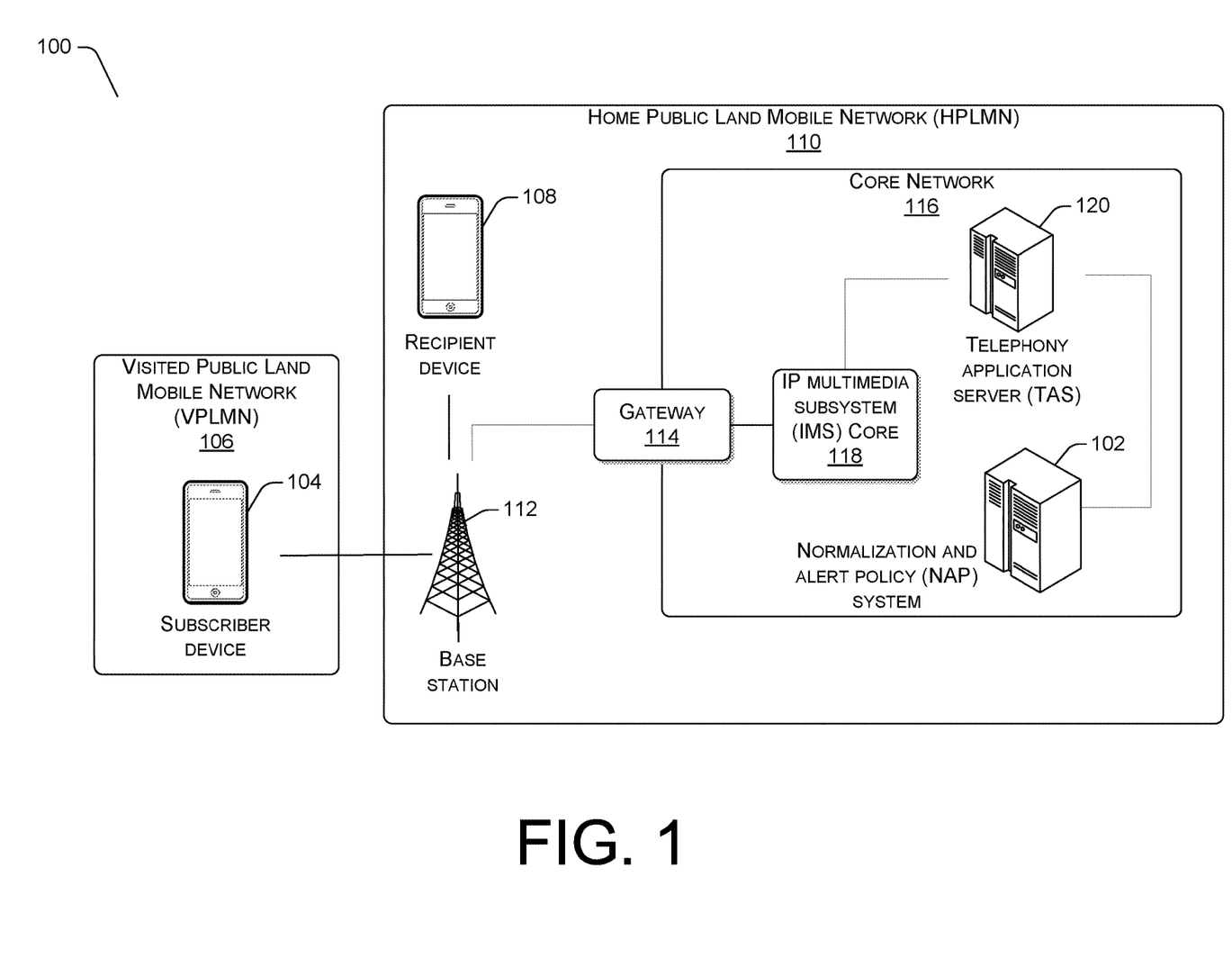
FIG. 1 illustrates an exemplary computing environment of a Normalization and Alert Policy (NAP) system that facilitates a subscriber device roaming within a VPLMN and initiating a VoLTE call request to a recipient device with the HPLMN of the subscriber device.

FIG. 1 illustrates an exemplary computing environment of a Normalization and Alert Policy (NAP) system 102 that facilitates a subscriber device 104, roaming within a VPLMN 106, initiating a VoLTE call request to a recipient device 108 with the HPLMN 110 of the subscriber device 104. In one example, the VPLMN 106 may correspond to a different country or regional area, relative to the HPLMN 110.

When the subscriber device 104 connects to the VPLMN 106, there may be communications between the VPLMN 106 and the HPLMN 110 to register the subscriber device 104 on the VPLMN 106. During the process of registering the subscriber device 104, a P-VPLMN-ID (PVNI) may be stored on the subscriber device 104, which indicates the country (i.e. VPLMN 106), or geographic region, within which the subscriber device 104 currently resides. The PVNI may comprise of a two-digit or a three-digit country code (MCC), which identifies a country or a geographic area, and a mobile network code (MNC), which identifies an HPLMN 110 of the subscriber device.

In the illustrated example, the subscriber device 104 may initiate a VoLTE call while roaming within the VPLMN 106. In doing so, a VoLTE call request may be sent to the HPLMN 110, via a base station 112 and gateway 114 of a core network 116 of the HPLMN 110. The VoLTE call request may be further routed from the gateway 114 and via an IP Multimedia Subsystem (IMS) core 118, to a Telephone Application Server (TAS) 120 that interacts with the Normalization and Alert Policy (NAP) system 102.

In response to an interaction between the TAS 120 and NAP system 102, the TAS 120 may facilitate establishing the VoLTE communication associated with the VoLTE call request between the subscriber device 104 that is roaming within the VPLMN 106 and the recipient device 108 within the HPLMN 110.

In the illustrated example, the HPLMN 110, and VPLMN 106, may provide telecommunications and data communications in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5G-New Ratio (5G-NR), and/or so forth. The computing environment 100 may include a core network 116. The core network 116 may provide telecommunication and data communication services to multiple client devices, such as a 3G-compatible client device, an LTE-compatible client device, and a 5G-NR-compatible device collectively referred to the subscriber device 104. The subscriber device 104 may correspond to any sort of electronic device operating on the telecommunications network, such as a cellular phone, a smartphone, a tablet computer, an electronic reader, a media player, a gaming device, a personal computer (PC, a laptop computer), etc. The subscriber device 104 may have a subscriber identity module (SIM), such as an eSIM, to identify the respective electronic device to a telecommunications service provider network (also referred to herein as "telecommunications network").

The core network 116 may further include an IMS core 118, the Telephony Application Server (TAS) 120, and the NAP system 102. The TAS 120 may emulate calling features traditionally provided by a Public Switched Telephone Network (PSTN), such as call forwarding, voicemail, conference bridges, and/or so forth. In the illustrated example, the TAS 120 may facilitate establishing a VoLTE communication between a subscriber device and recipient device using an adjusted recipient call number from the NAP system 102.

The HPLMN 110 may include multiple base stations, such as base station 112, as well as a core network 116 that serves one or more subscriber device(s), such as the subscriber device 104. In the illustrated example, the subscriber device 104 may be associated with a subscriber account, such as a telecommunications service account. The subscriber account may include a plurality of subscribers, each of whom shares access to service features accessible via the HPLMN 110. The service features may include various mediums of communication, such as voice communications and text communications (i.e. SMS and MMS).

Further, the gateway 114 may include one or more servers and related components that are tasked with providing connectivity between the IMS core 118, the subscriber device 104 and the internet. More specifically, the gateway 114 may act as a point of entry and exit for data traffic.

Figure 2:
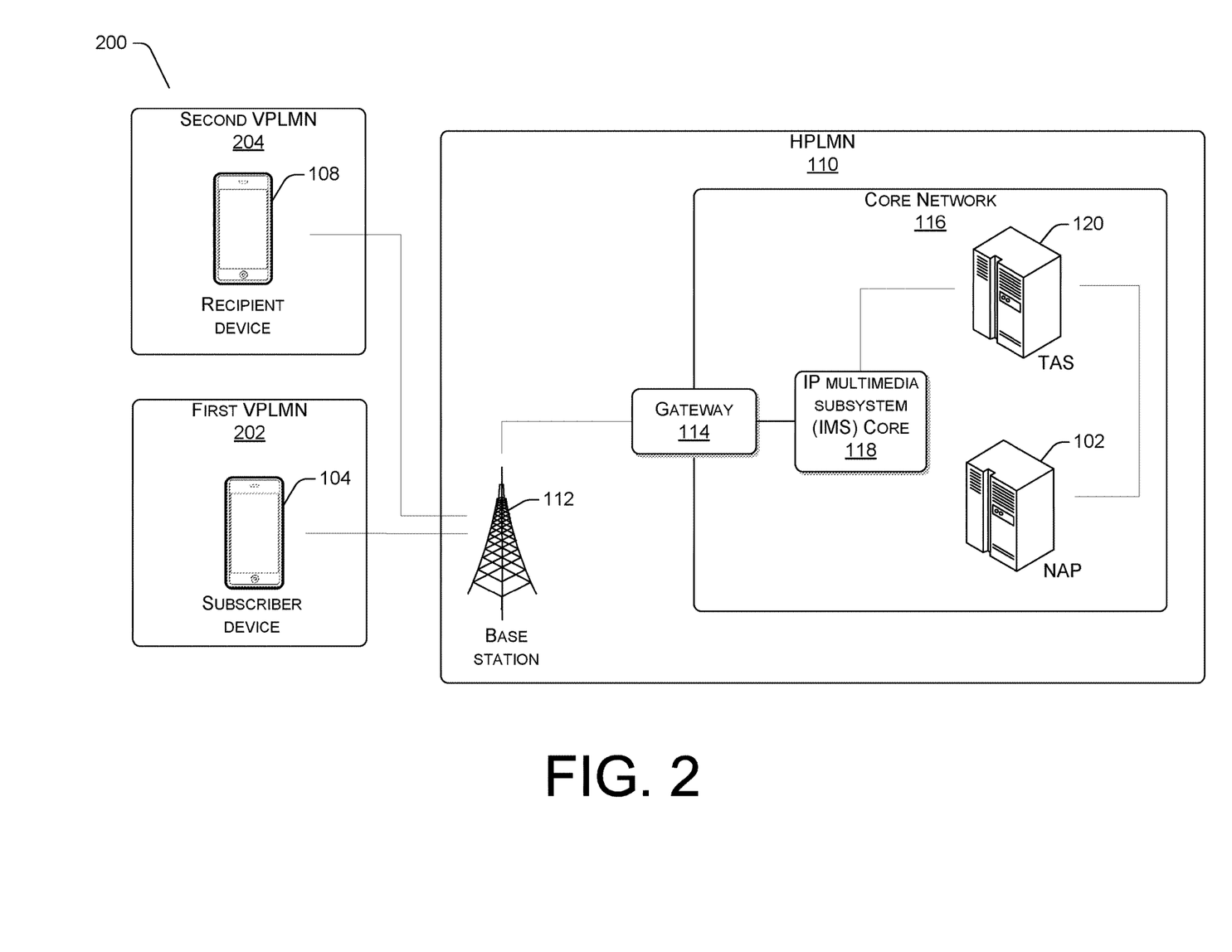
FIG. 2 illustrates an exemplary computing environment of a NAP system that facilitates a subscriber device roaming within a VPLMN and initiating a VoLTE call request to a recipient device within the same, or another VPLMN.

FIG. 2 illustrates an exemplary computing environment 200 of a NAP system 102 that facilitates a subscriber device 104 roaming within a first VPLMN 202 and initiating a VoLTE call request to a recipient device within a second VPLMN 204. In one example, the second VPLMN 204 is a different telecommunication network to the first VPLMN 202. In another example, the second VPLMN 204 is the same telecommunication network as the first VPLMN 202.

The computing environment 200 includes various components that are the same or substantially similar to the computing environment 100 described with reference to FIG. 1, except for the routing of the VoLTE call communication to a recipient device in the same, or another VPLMN. As such, for brevity and ease of description, various details relating to the computing environment 200 are omitted herein to the extent that the same or similar details have been provided above with reference to FIG. 1.

In the illustrated example, the subscriber device 104 may initiate a VoLTE call request while roaming within the first VPLMN 202. In doing so, a VoLTE call request may be sent to the HPLMN 110, via a base station 112 and gateway 114 of the core network 116. The VoLTE call request may be further routed from the gateway 214 and via the IMS core 118, to the TAS 120 that interacts with the NAP system 102.

In response to an interaction between the TAS 120 and NAP system 102, the TAS 120 may selectively establish a VoLTE communication between the subscriber device 104 that is roaming within the first VPLMN 202 and the recipient device 108 that is associated with the second VPLMN 204.

Figure 3:
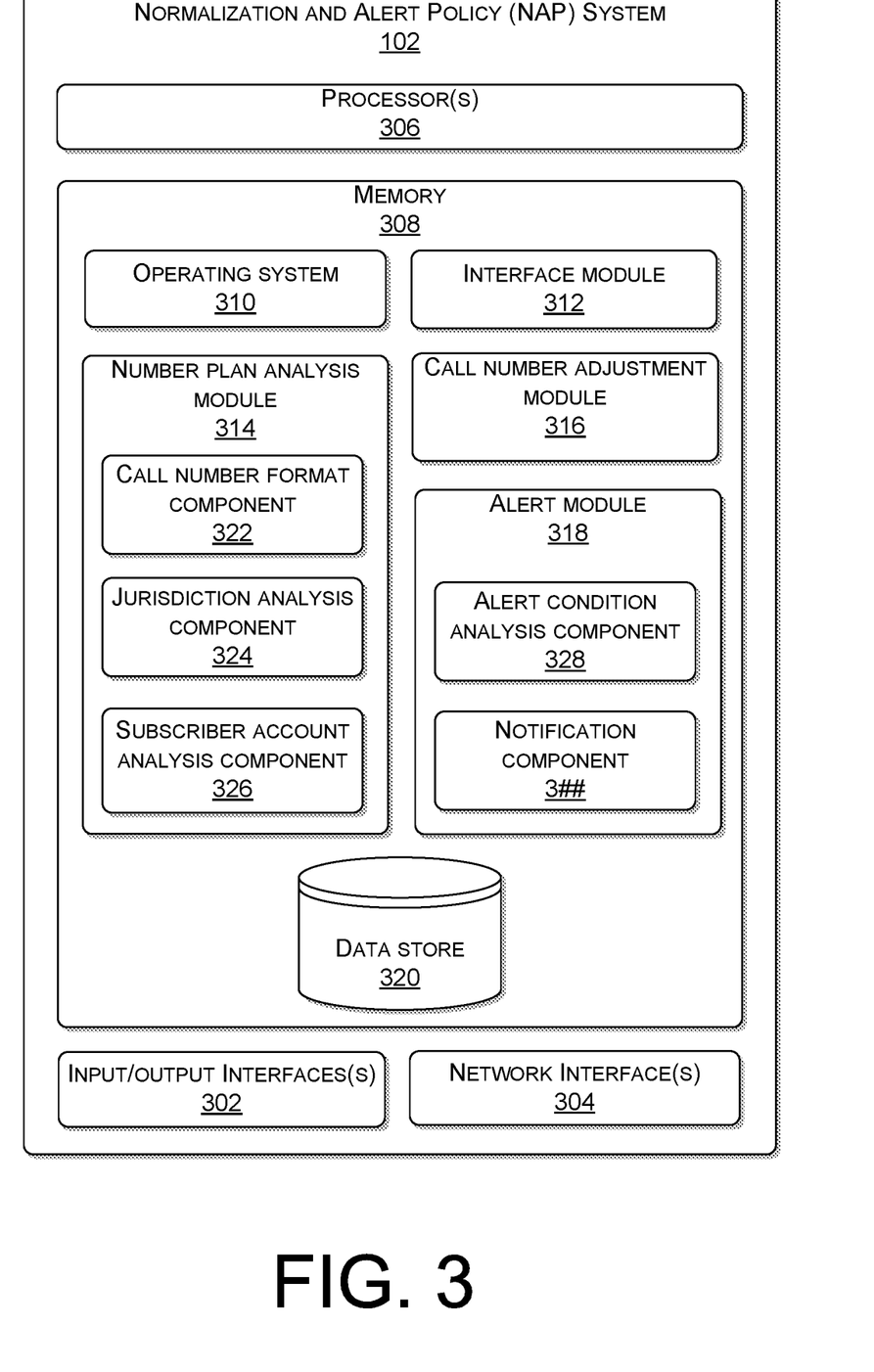
FIG. 3 illustrates a block diagram of various components of the NAP system.

FIG. 3 illustrates a block diagram of various components of the Normalization and Alert Policy (NAP) system. The NAP system 102 may be configured to detect a VoLTE call request with a recipient call number that lacks a country code, and whereby the VoLTE call request is initiated by a subscriber device while roaming in a VPLMN. The NAP system 102 may analyze the VoLTE call request to determine an intended country code and adjust the recipient call number to include the country code. Further, the NAP system 102 may analyze the adjusted recipient call number to determine whether initiating a VoLTE call in response to the VoLTE call request may trigger an alert condition. An alert condition may relate to determining that the VoLTE call request may initiate a cost-prohibitive VoLTE communication or that the VoLTE call request relates a fraudulent communication.

The NAP system 102 may include input/output interface(s) 302. The input/output interface(s) 302 may include any type of output interface known in the art, such as a display (e.g. a liquid crystal display), speakers, a vibrating mechanism, or a tactile feedback mechanism. Input/output interface(s) 302 also include ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the NAP system 102 may include network interface(s) 304. The network interface(s) 304 may include any sort of transceiver known in the art. For example, the network interface(s) 304 may include a radio transceiver that performs the function of transmitting and receiving radio frequency communications via an antenna. In addition, the network interface(s) 304 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 304 may include wired communication components, such as an Ethernet port or a Universal Serial Bus (USB).

Further, the NAP system 102 may include one or more processor(s) 306 that are operably connected to memory 308. In at least one example, the one or more processor(s) 306 may be a central processing unit(s) (CPU), graphics processing unit(s) (GPU), or both a CPU and GPU or any other sort of processing unit(s). Each of the one or more processor(s) 306 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 306 may also be responsible for executing all computer applications stored in the memory, which can be associated with common types of volatile (RAM) and/or non-volatile (ROM) memory.

In some examples, memory 308 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 308 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 308 may include an operating system 310, an interface module 312, a number plan analysis module 314, a call number adjustment module 316, an alert module 318, and a data store 320. The operating system 310 may be any operating system capable of managing computer hardware and software resources. The operating system 310 may include an interface layer that enables applications to interface with the input/output interface(s) 302 and the network interface(s) 304. The interface layer may comprise public APIs, private APIs, or a combination of both. Additionally, the operating system 310 may include other components that perform various other functions generally associated with an operating system.

The interface module 312 may be configured to interface with a TAS 120 associated with an HPLMN 110. The TAS 120 may be a component of a telecommunication network that emulates calling features traditionally provided by a PSTN, such as call forwarding, voicemail, conference bridges, and/or so forth. The interface module 312 may interface with the TAS to capture a recipient call number from a VoLTE call request initiated by a subscriber device at a VPLMN, and to return an adjusted recipient call number that includes a missing country code.

First, the interface module 312 may receive, from the TAS, a VoLTE call request initiated by a subscriber device, while the subscriber device is roaming in a VPLMN. In doing so, the interface module 312 may facilitate the NAP system 102 in verifying that the recipient call number associated with the VoLTE call request includes a country code and that the VoLTE call request, when initiated from the VPLMN, does not trigger an alert condition. The TAS may be configured to push a VoLTE call request to the interface module 312. Alternately, the interface module 312 may monitor the TAS, via a monitoring agent, and dynamically intercept (i.e. pull) a VoLTE call request that is received at the TAS.

Second, the interface module 312 may transmit to the TAS, an adjusted recipient call number that includes a missing country code. In some examples, the interface module 312 may also transmit an indication to the TAS to terminate the VoLTE call request based on a detected alert condition.

The interface module 312 may be further configured to interface with a subscriber device and provide the subscriber device with selectable options to proceed with, or terminate, a VoLTE call request based on a detected alert condition. For example, the alert module 318 may determine that initiating a VoLTE call request using an adjusted recipient number from within the VPLMN may result in a VoLTE communication that incurs an inordinately high unit cost per increment of time. Therefore, the interface module 312 may transmit computer-executable instructions to the subscriber device that cause a display of the subscriber device to present an alert notification and selectable options to proceed with, or terminate, the VoLTE call request. The alert notification may describe the nature of the alert condition (i.e. fraudulent call number or cost-prohibitive VoLTE communication). In response to receiving a selection to proceed with, or terminate, the VoLTE call request, the interface module 312 may communicate the same to the TAS for implementation.

The number plan analysis module 314 may analyze a recipient call number associated with a VoLTE call request to determine whether the recipient call number includes a country code. In cases where a country code is missing from the recipient call number, the number plan analysis module 314 may use one or more trained machine learning algorithms to determine the country code based at least in part on the recipient call number.

The number plan analysis module 314 may include a call number format component 322, a jurisdiction analysis component 324 and a subscriber account analysis component 326. The call number format component 322 may determine whether a recipient call number associated with a VoLTE call request initiated at a VPLMN is lacking a country code. The call number format component 322 may analyze the prefix two or three digits of a recipient call number to determine whether a country code has been included. The call number format component 322 may analyze the recipient call number relative to a list of country codes included with the data store 320.

In response to detecting a country code, the call number format component 322 may determine whether the call number format for the recipient call number corresponds to the detected country code. For example, a VoLTE call request may include a recipient call number of 0151-1234. The call number format component 322 may detect that the 0151 relates to a non-geographic area code for a German mobile device, thus the 0151 may be considered as the country code. However, the call number format component 322 may compare the call number format of the recipient call number with a total number of digits for a German mobile number. In this example, three digits are missing. Therefore, the call number format component 322 may determine that since the number of digits of the recipient call number (i.e. 8 digits long) is fewer than the total number of digits for a German mobile number (i.e. 11 digits, including the trunk code 0), the recipient call number is not properly formatted with a country code (i.e. German country code in this example).

In response, in determining that a recipient call number does not include a country code, the jurisdiction analysis component 324 and the subscriber account analysis component 326 may, individually, or in combination, determine or infer a likely country code for the recipient call number. The NAP system 102 may be configured to invoke the jurisdiction analysis component 324 and the subscriber account analysis component 326 to determine the country code. As discussed in further detail below, the NAP system 102 may invoke each component sequentially in any order, in parallel, cooperatively, or individually.

The jurisdiction analysis component 324 may be configured to analyze a recipient call number that is missing a country code and determine the country code. The jurisdiction analysis component 324 may retrieve, from the data store 320, a number plan registry that includes call numbers for one or more jurisdictions (i.e. countries). In some examples, a single number plan registry may include call numbers for the HPLMN and one or more VPLMNs, including the VPLMN from which the subscriber device initiated the VoLTE call request. In other examples, individual number plan registries may correspond to each of the HPLMN and one or more VPLMNs. Thus, the jurisdiction analysis component 324 may analyze the recipient number relative to the plurality of number plan registries in order to determine or infer a likely country code.

In one example, the jurisdiction analysis component 324 may use one or more trained machine learning algorithms to identify a national destination code (NDC) or a number planning area (NPA) code, within the recipient call number, that is indicative of a particular jurisdiction. For example, the recipient call number may include a "310" area code, and a comparison of the recipient call number with a U.S. number plan registry may indicate that the "310" area code is associated with a California mobile number. Thus, the jurisdiction analysis component 324 may determine that the missing country code is "+1" (i.e. the United States country code).

In another example, the jurisdiction analysis component 324 may identify one or more jurisdictions that share a common NDC code or NPA code. For example, the area code "310" may correspond to a mobile device in Berlin, Germany, or a mobile device in California, USA. In these instances, the jurisdiction analysis component 324 may analyze the recipient call number format (i.e. number of digits) to infer a likely jurisdiction. Alternately, the jurisdiction analysis component 324 may cooperate with the subscriber account analysis component 326 to determine the missing country code.

The subscriber account analysis component 326 may be configured to determine a missing country code by analyzing a subscriber account associated with the subscriber device. For example, the subscriber account analysis component 326 may retrieve, from the data store 320, a subscriber account from a data store 320. The subscriber account may include a set of historical communication records associated with one or more subscriber devices. The set of historical communications records may include VoLTE calls initiated and received by subscriber devices associated with the subscriber account over a predetermined time interval. The predetermined time interval may be any time interval. The time interval may correspond to a billing cycle or the length of time that the subscriber account has been active.

In one example, the subscriber account analysis component 326 may use one or more trained machine learning algorithms to analyze the recipient call number relative to the set(s) of historical communication records within the subscriber account. In this way, the subscriber account analysis component 326 may determine the country code for the recipient call number by matching the recipient call number with a call number within at least one record of the set(s) of historical communication records.

In another example, the subscriber account analysis component 326 may interact with the jurisdiction analysis component 324 to determine the country code of the recipient call number. As discussed earlier, the jurisdiction analysis component 324 may determine that the recipient call number relates to a plurality of jurisdictions. Therefore, the subscriber account analysis component 326 may analyze the set(s) of historical communication records to determine whether the recipient call number has been historically dialed by a subscriber device of the subscriber account. Alternately, the subscriber account analysis component 326 may infer a likely jurisdiction based on the prevalence of historical communications within one of the jurisdictions in the set(s) of historical communication records. For example, consider an indication from the jurisdiction analysis component 324 that the recipient call number is likely associated with Germany or the United States. The subscriber account analysis component 326 may infer a country code of "+1" for the United States based on the prevalence of historical communications with mobile devices within a United States PLMN and the relative lack of historical communications with mobile devices within a German PLMN. Additionally, or alternatively, the subscriber account analysis component 326 may infer a country code based on the HPLMN of the subscriber device, or the VPLMN from which the subscriber device has initiated the VoLTE call request.

The call number adjustment module 316 may be configured to generate an adjusted recipient call number that includes the country code as a prefix to the recipient call number. In this example, the call number adjustment module may interact with the interface module 312 and the number plan analysis module to retrieve the recipient call number and the country code.

The alert module 318 may be configured to determine whether initiating a VoLTE call request using the adjusted recipient call number (i.e. recipient call number that includes the determined country code) is likely to trigger an alert condition. In some examples, the alert condition may relate to determining that the VoLTE call request may initiate a cost-prohibitive VoLTE communication or that the VoLTE call request relates a fraudulent communication.

The alert module 318 may further include an alert condition analysis component 328 and a notification component 330. The alert condition analysis component 328 may analyze initiating a VoLTE communication using the adjusted recipient call number at the VPLMN based at least in part on one or more alert parameters. The one or more alert parameters may include criteria that relate to detecting a fraudulent VoLTE communication at the VPLMN or a cost-prohibitive VoLTE communication initiated at the VPLMN.

The alert condition analysis component 328 may use the one or more alert parameters to generate an alert score, based at least in part on an analysis of initiating the VoLTE call request. The alert score may be configured to indicate a likelihood that a particular alert condition (i.e. fraudulent or cost-prohibitive VoLTE communication) is triggered by initiating a VoLTE communication using the adjusted recipient call number at the VPLMN.

In one example, consider an alert condition that relates to the unit cost per increment of time for an established VoLTE communication associated with the VoLTE call request. In this example, an operator of the NAP system 102, an administrator of the HPLMN, or a subscriber associated with the subscriber account, may set alert parameters that define a permissible unit cost per increment of time for a VoLTE communication while the subscriber device is roaming in a VPLMN. Therefore, the alert condition analysis component 328 may analyze the actual unit cost per increment of time for initiating a VoLTE communication associated with a VoLTE call request and derive an alert score based on a comparison of the projected unit cost and the permissible unit cost. A VoLTE communication with a particular unit cost may produce a high alert score when compared to another VoLTE communication with a relatively lower unit cost.

Continuing with this example, the alert condition analysis may generate an alert score based on the unit cost per increment of time. The alert score may be an alpha-numeric expression (i.e. 0 to 10, or A to F), a descriptive expression (i.e. low, medium, or high), based on color (i.e. green, yellow, red), or any other suitable scale that reflects a likelihood that an alert condition is initiated by a VoLTE communication. A high alert score may correspond to 8-10, D to F, or red, and a low alert score may correspond to 1-3, A-B, and low.

Further, the alert condition analysis component 328 may compare the alert score with one or more predetermined alert thresholds, with each predetermined alert threshold triggering a separate set of actions. For example, in response to the alert score being less than a predetermined alert threshold, the alert condition analysis component 328 may transmit the adjusted recipient call number to the TAS, whereby the TAS may facilitate establishing a VoLTE communication using the adjusted recipient call number. Alternatively, in response to the alert score being greater than a predetermined alert threshold, the alert condition analysis component 328 may transmit an indication to the TAS to terminate the VoLTE call request. For example, continuing with the previous example, the predetermined alert threshold for an alert condition relating to the unit cost per increment of time for a VoLTE communication may be set at a predetermined permissible unit cost. Thus, in response to the alert score for the projected unit cost being greater than the predetermined alert threshold (i.e. the projected unit cost being greater than the permissible cost), the alert condition analysis component 328 may transmit an indication t the TAS to terminate the VoLTE call request.

In some examples, the alert condition analysis component 328 may be configured to analyze the alert score relative to more than one predetermined alert threshold, with each predetermined alert threshold triggering a separate set of actions. For example, the alert condition analysis component 328 may determine that an alert score is greater than a first predetermined alert threshold but less than a second predetermined alert threshold. In this instance, rather than transmitting an indication to the TAS to terminate the VoLTE, the alert condition analysis component 328 may generate computer executable instructions for delivery to a subscriber device that initiated the VoLTE call request. The computer-executable instructions may cause the subscriber device to present an alert notification and selectable options to terminate the VoLTE call request or proceed with the VoLTE call request. Similarly, the alert condition analysis component 328 may determine that an alert score is greater than the first and second predetermined alert threshold, and in doing so, transmit an indication to the TAS to terminate the VoLTE call request.

Moreover, the alert condition analysis component 328 may analyze alert conditions that relate to fraudulent VoLTE communications associated with the VoLTE call request. In one example, a fraudulent VoLTE communication may be detected by identifying a likely instance of "traffic pumping." Traffic pumping, also known as access stimulation, occurs when a local network (i.e. the VPLMN) inflates the volume of incoming calls (i.e. VoLTE communication) into another PLMN (i.e. the HPLMN or another VPLMN), and profits from the intercarrier compensation fees. In this case, the alert condition analysis component 328 may detect instances of traffic pumping based on the jurisdiction within which the VoLTE call request was initiated and the jurisdiction within which the recipient of the adjusted recipient call number resides. For example, if traffic pumping is historically prevalent between Iceland and Germany, then the alert condition analysis component 328 may infer that a VoLTE call request initiated in Iceland and intended for a recipient call number that resides in Germany may be related to "traffic pumping." In some examples, the alert condition analysis component 328 may interact with the number plan analysis module 314 to determine whether the recipient call number is valid, irrespective of the originating and receiving jurisdictions (i.e. indications of traffic pumping).

In another example, a fraudulent VoLTE communication may relate to a VoLTE call request intended for an impermissible call number. In this example, the alert condition analysis component 328 may retrieve, from the data store 320, a list of impermissible call numbers associated with the VPLMN within which the VoLTE call request was initiated, and the PLMN (i.e. HPLMN or other VPLMN) within which the adjusted recipient call number resides. The alert condition analysis component 328 may compare the adjusted recipient call number with the list of impermissible call numbers to determine whether a match exists. In doing so, the alert condition analysis component 328 may generate an alert score, based on whether a match exists, and the degree to which the impermissible call number poses a fraud risk.

Similar to the example relating to the unit cost of a VoLTE communication, the alert condition analysis component may determine whether the alert score for the fraudulent VoLTE communication is greater than or equal to one or more predetermined alert thresholds, with each predetermined alert threshold triggering a separate set of actions. Consider an example with a first predetermined alert threshold and a second predetermined threshold that is higher than the first predetermined alert threshold. In response to the alert score being less than a first predetermined threshold, the alert condition analysis component 328 may transmit the adjusted recipient call number to the TAS, whereby the TAS may facilitate establishing a VoLTE communication using the adjusted recipient call number. In response to the alert score being greater than a first predetermined alert threshold but less than the second predetermined alert threshold, the alert condition analysis component 328 may generate computer executable instructions for delivery to a subscriber device that presents an alert notification and selectable options to terminate the VoLTE call request or proceed with the VoLTE call request. In response to the alert score being greater than the second predetermined threshold, the alert condition analysis component 328 may transmit an indication to the TAS to terminate the VoLTE call request.

The notification component 330 may generate notifications intended for the TAS. These notifications may indicate to the TAS to facilitate establishing a VoLTE communication associated with the VoLTE call request or terminating the VoLTE call request. Further, the notification component 330 may generate notifications intended for a subscriber device. These notifications may indicate to the subscriber device, the nature of an alert condition (i.e. cost-prohibitive VoLTE communication or a fraudulent VoLTE communication) and provide one or more selectable options to proceed with the VoLTE call request or terminate the VoLTE call request.

The data store 320 may include one or more data records used by the number plan analysis module 314 and the alert module 318. For example, the data store 320 may include a number plan registry, a listing of country codes along with non-geographic area codes commonly designated to mobile devices within one or more countries. For example, a "0151" non-geographic area code is presently assigned to T-MO-BILE (Registered Trademark) GSM/UMTS mobile devices.

The data store 320 may further include a subscriber account data associated with subscribers of the HPLMN. The data store 320 may also include a list of impermissible call numbers used to identify a fraudulent VoLTE communication.

Figure 4:
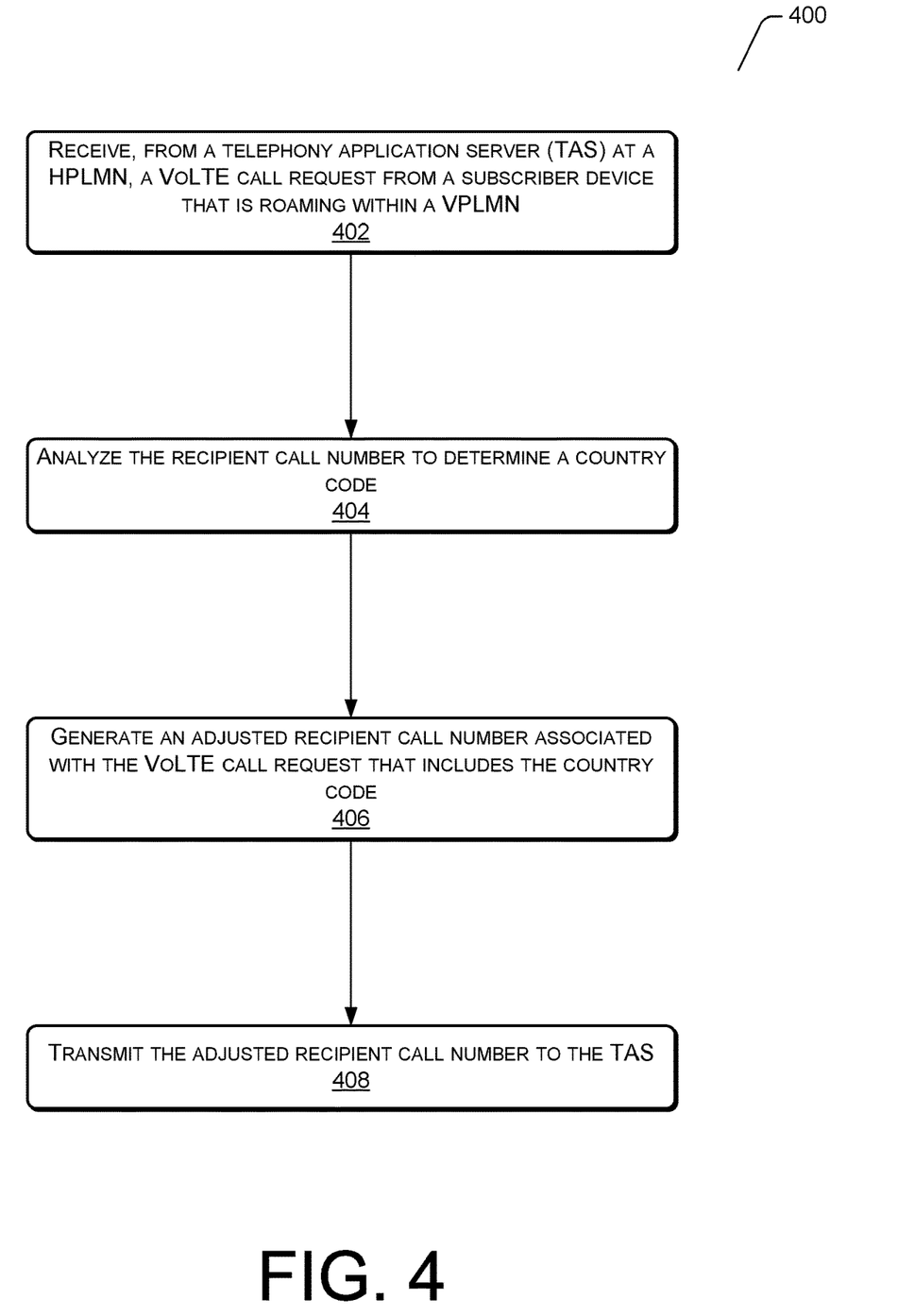
FIG. 4 illustrates a process for generating an adjusted recipient call number for delivery to a Telephone Application Server (TAS).
Figure 5:
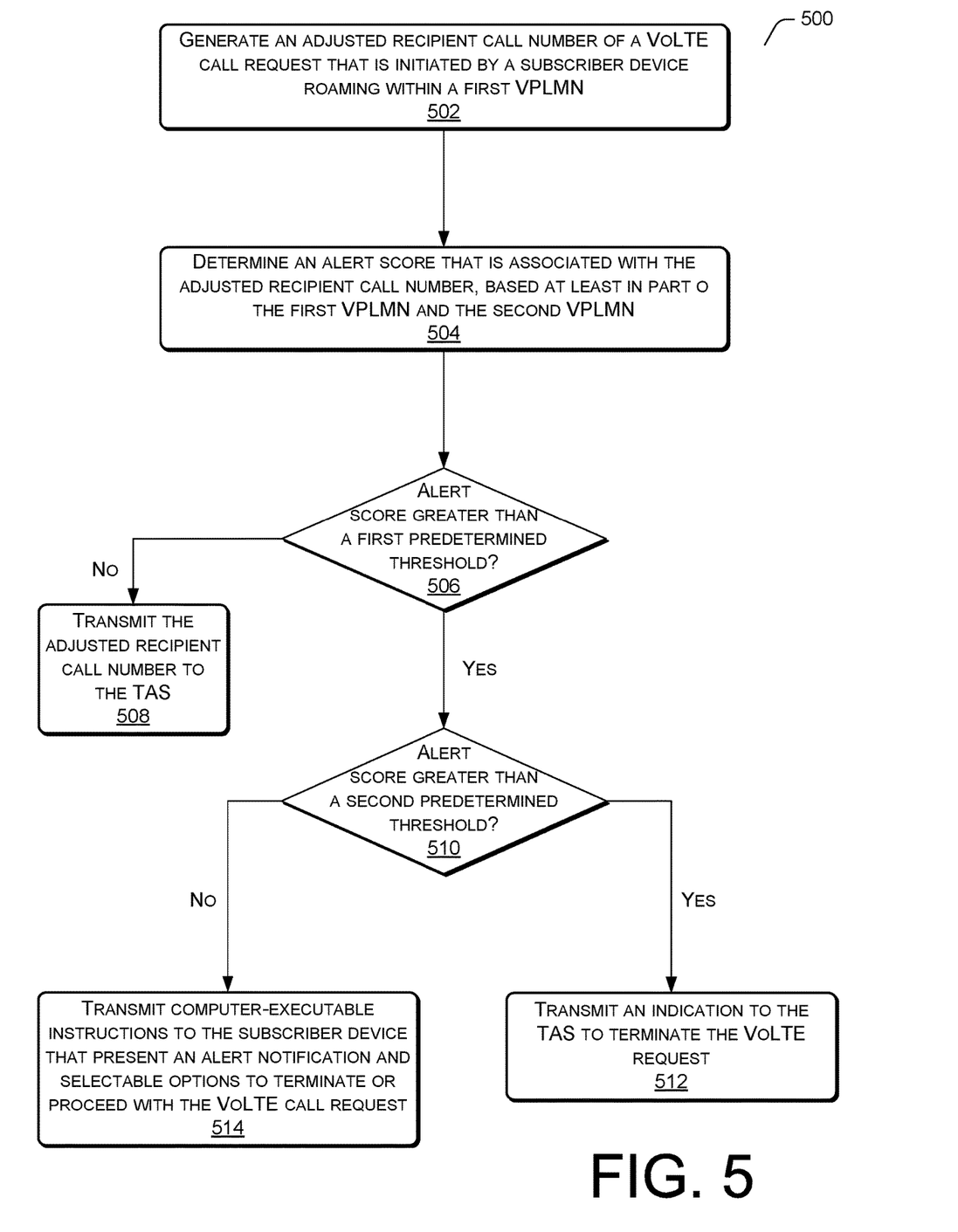
FIG. 5 illustrates a process for determining whether initiating a VoLTE communication based on an adjusted recipient number is likely to trigger an alert condition.

FIGS. 4 and 5 present processes 400 and 500 that relate to operations of the Normalization and Alert Policy (NAP) system. Each of processes 400 and 500 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 and 500 are described with reference to the first computing environment 100 of FIG. 1 and the second computing environment 200 of FIG. 2.

FIG. 4 illustrates a process for generating an adjusted recipient call number for delivery to a TAS. Specifically, process 400 includes steps for a NAP system to detect a VoLTE call request that is initiated by a subscriber device that is roaming in a VPLMN. The VoLTE call request may include a recipient call number that lacks a country code. Therefore, process 400 further describes determining a country code and adjusting the recipient call number to including the country code.

At 402, the NAP system may receive from the TAS and at an HPLMN, a VoLTE call request from a subscriber device that is roaming within a VPLMN. The VoLTE call request may include a recipient call number that lacks a country code. Since the VoLTE call request is initiated from a VPLMN, the country code may implicitly relate to the VPLMN. Alternatively, the VoLTE call request may be intended for a recipient call number within the HPLMN of the subscriber device, or a different VPLMN altogether.

At 404, the NAP system may analyze the recipient call number to determine a country code. In one example, the NAP system may determine a likely country code by analyzing the recipient call number relative to a number plan registry that includes call numbers for one or more jurisdictions. In some examples, the NAP system may identify an NDC or NPA code within the recipient call number that is indicative of a particular jurisdiction.

Additionally, or alternatively, the NAP system may analyze the recipient call number relative to one or more sets of historical communication records associated with a subscriber account of the subscriber device. Each set of historical communication records may include VoLTE communications initiated by and received at subscriber devices associated with the subscriber account over a predetermined time interval.

At 406, the NAP system may generate an adjusted recipient call number associated with the VoLTE call request. The adjusted recipient call number may include the determined country code as a prefix to the recipient call number provided in the VoLTE call request.

At 408, the NAP system may transmit the adjust recipient call number to the TAS. In some examples, the TAS may be configured to establish a VoLTE communication at the VPLMN using the adjusted recipient call number.

FIG. 5 illustrates a process for determining whether initiating a VoLTE communication based on an adjusted recipient number is likely to trigger an alert condition. In various examples, the alert condition may relate to determining that the VoLTE call request may initiate a cost-prohibitive VoLTE communication or that the VoLTE call request relates to a fraudulent communication.

At 502, the NAP system may generate an adjusted recipient call number for a VoLTE call request that is initiated by a subscriber device roaming within a first VPLMN. The process by which the NAP system may generate the adjusted recipient call number is discussed in detail with reference to process 400 and FIG. 4.

At 504, the NAP system may generate an alert score that indicates a likelihood that a particular alert condition is triggered by initiating a VoLTE communication using the adjusted recipient call number at the VPLMN. The alert score may be based on one or more alert parameters that provide criteria to assess a VoLTE request. For example, consider an alert parameter that describes a permissible unit cost per increment of time for a VoLTE communication. This alert parameter may be used to generate an alert score for an alert condition relating to a cost-prohibitive VoLTE communication.

Similarly, consider another alert parameter that indicates particular combinations of PLMNs that are historically responsible for traffic pumping. This alert parameter may be used to generate an alert score for an alert condition relating to a fraudulent VoLTE communication.

At 506, the NAP system may determine whether the alert score associated with the recipient call number is greater than a first predetermined alert threshold. By way of example, the predetermined alert threshold for a cost-prohibitive alert condition may correspond to a predetermined permissible unit cost per increment of time for a VoLTE communication. The permissible cost may be set by an operator of the NAP system, an administrator of the HPLMN, or a subscriber associated with the subscriber account.

At 508, the NAP system may determine that the alert score is less than or equal to the first predetermined alert threshold. In doing so, the NAP system may transmit the adjusted recipient call number to the TAS, whereby the TAS may facilitate establishing a VoLTE communication using the adjusted recipient call number.

At 510, the NAP system may determine that the alert score is greater than the first predetermined alert threshold. The NAP system may then compare the alert score relative to an additional predetermined alert threshold. In some examples, the NAP system may compare the alert score with more than one predetermined alert thresholds, with each predetermined alert threshold triggering a separate set of actions.

At 512, the NAP system may determine that the alert score is greater than the second predetermined alert threshold. The NAP system may then transmit an indication to the TAS to terminate the VoLTE request. In this example, the second predetermined alert threshold represents an upper limit to an alert condition. Continuing with the example of a cost-prohibitive VoLTE communication, the second predetermined alert threshold may represent the upper limit of the permissible unit cost per increment of time.

At 514, the NAP system may determine that the alert score is less than the second predetermined alert threshold. The NAP system may generate computer executable instructions for delivery to the subscriber device that cause the subscriber device to present an alert notification and selectable options to terminate the VoLTE call request or proceed with the VoLTE call request. The alert notification may describe the nature of the alert condition (i.e. fraudulent call number or cost-prohibitive VoLTE communication). In response to receiving a selection to proceed with the VoLTE call request to terminate the VoLTE call request, the NAP system may communicate the same to the TAS for implementation.

Conclusion

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system comprising:
one or more processors;
memory coupled to the one or more processors, the memory including one or more modules that are executable by the one or more processors to:
receive, from a Telephone Application Server (TAS), a Voice over Long-Term Evolution (VoLTE) call request initiated by a subscriber device at a Visited Public Land Mobile Network (VPLMN);
determine whether a recipient call number associated with the VoLTE call request includes a country code;
in response to the recipient call number lacking the country code, determine the country code for the recipient call number;
modify the recipient call number to create an adjusted recipient call number, the adjusted recipient call number including the country code as a prefix to the recipient call number;
determine an alert score associated with the adjusted recipient call number; and
in response to the alert score being less than a predetermined alert threshold, transmit the adjusted recipient call number to the TAS, the TAS to establish a VoLTE call associated with the VoLTE call request using the adjusted recipient call number,
wherein the predetermined alert threshold corresponds to a unit cost per increment of time for an established VoLTE communication associated with the VoLTE call request.

2. The system of claim 1, wherein the one or more modules are further executable by the one or more processors to:
retrieve, from a subscriber account associated with the subscriber device, a set of historical communication records conducted over a predetermined time interval, and
wherein, to determine the country code is based at least in part on an analysis of the recipient call number relative to the set of historical communication records.

3. The system of claim 1, wherein the one or more modules are further executable by the one or more processors to:
retrieve a number plan registry associated with a Home Public Land Mobile Network (HPLMN) of the subscriber device; and
analyze the recipient call number to identify at least one of a national destination code (NDC) or a number planning area (NPA), based at least in part on the number plan registry, and
wherein, to determine the country code is based at least in part on one of the NDC or the NPA.

4. The system of claim 1, wherein the one or more modules are further executable by the one or more processors to:
retrieve a number plan registry associated with an HPLMN of the subscriber device; and
analyze the recipient call number to identify at least one of a national destination code (NDC) or a number planning area (NPA), based at least in part on the number plan registry, and
wherein, to determine the country code is based at least in part on one of the NDC or the NPA.

5. The system of claim 1, wherein the one or more modules are further executable by the one or more processors to:
determine that the recipient call number corresponds to a first recipient device within an HPLMN of the subscriber device and a second recipient device within the VPLMN;
retrieve, from a subscriber account associated with the subscriber device, a set of historical communication records conducted over a predetermined time interval; and
infer a likelihood that the recipient call number is associated with one of the VPLMN or the HPLMN based at least in part on the set of historical communication records conducted via the subscriber account, and wherein, to determine the country code is based at least in part on an inference that the recipient call number is associated with one of the VPLMN or the HPLMN.

6. The system of claim 1, wherein the one or more modules are further executable by the one or more processors to:
retrieve one or more alert parameters that identify an at-risk VoLTE communication, the at-risk VoLTE communication corresponding to a fraudulent VoLTE communication or a cost-prohibitive VoLTE communication; and
analyze the VoLTE call request using the adjusted recipient call number at the VPLMN, based at least in part on the one or more alert parameters, and
wherein, to determine the alert score for the adjusted recipient call number is based at least in part on an analysis of initiating the VoLTE call request.

7. The system of claim 1, wherein the one or more modules are further executable by the one or more processors to:
retrieve, from a data store, a list of impermissible call numbers that are associated with at least one of an HPLMN of the subscriber device or the VPLMN, and
wherein to determine the alert score for the adjusted recipient call number is based at least in part on an analysis of the adjusted recipient call number relative to the list of impermissible call numbers.

8. The system of claim 1, wherein a high alert score corresponds to a high unit cost per increment of time.

9. The system of claim 1, wherein the predetermined alert threshold is a first predetermined alert threshold, and wherein one or more modules are further executable by the one or more processors to:
determine that the alert score is greater than or equal to a second predetermined alert threshold, the second predetermined alert threshold being greater than the first predetermined alert threshold; and
transmit an indication to the TAS to terminate the VoLTE call.

10. The system of claim 1, wherein the predetermined alert threshold is a first predetermined threshold, and wherein one or more modules are further executable by the one or more processors to:
determine that the alert score is greater than the first predetermined threshold and less than a second predetermined threshold; and
generate computer-executable instructions for delivery to the subscriber device, the computer-executable instructions to cause the subscriber device to present an alert notification and selectable options to terminate the VoLTE call request or proceed with the VoLTE call request.

11. A computer-implemented method, comprising:
under control of one or more processors:
receiving, from a TAS, a VoLTE call request initiated by a subscriber device at a VPLMN;
determining that a recipient call number associated with the VoLTE call request lacks a country code;
analyzing the recipient call number to determine a country code;
modifying the recipient call number to create an adjusted recipient call number, the adjusted recipient call number including the country code as a prefix to the recipient call number;
determining an alert score for the adjusted recipient call number, the alert score being associated with a likelihood that the VoLTE call request is associated with a fraudulent VoLTE communication or a cost-prohibitive VoLTE communication; and
in response to the alert score being less than a predetermined alert threshold, transmitting the adjusted recipient call number to the TAS,
wherein the predetermined alert threshold corresponds to a unit cost per increment of time for an established VoLTE communication associated with the VoLTE call request.

12. The computer-implemented method of claim 11, further comprising: retrieving, from a data store, a number plan registry associated with at least one of an HPLMN of the subscriber device or the VPLMN, and
wherein analyzing the recipient call number further includes comparing the recipient call number with at least one of an NDC or an NPA stored within the number plan registry.

13. The computer-implemented method of claim 11, further comprising:
retrieving, from a data store, a subscriber account associated with the subscriber device, the subscriber account including a set of historical communication records conducted by at least the subscriber device, and
wherein, determining the country code is further based at least in part on an analysis of the recipient call number relative to the set of historical communication records.

14. The computer-implemented method of claim 11, further comprising:
retrieving a list of impermissible call numbers that is associated with the country code of the adjusted recipient call number; and
wherein, determining the alert score for the adjusted recipient call number is based at least in part on an analysis of the adjusted recipient call number relative to the list of impermissible call numbers.

15. The computer-implemented method of claim 11, further comprising:
determining that the alert score is greater than or equal to the predetermined alert threshold; and
transmitting an indication to the TAS to terminate the VoLTE call request.

16. One or more non-transitory computer-readable media storing computer-executable instructions that, when executed on one or more processors, cause the or more processors to perform acts comprising:
receiving, from a TAS, a VoLTE call request initiated by a subscriber device at a VPLMN;
determining that a recipient call number associated with the VoLTE call request lacks a country code;
retrieving, from a data store, a number plan registry associated with the VPLMN and an HPLMN of the subscriber device;
determining a country code for the recipient call number, based at least in part on an analysis of the number plan registry;
modifying the recipient call number to create an adjusted recipient call number, the adjusted recipient call number including the country code as a prefix to the recipient call number;
determining an alert score for the recipient call number; and
in response to the alert score being less than a predetermined alert threshold, transmitting the adjusted recipient call number to the TAS, wherein the predetermined alert threshold corresponds to a unit cost per increment of time for an established VoLTE communication associated with the VoLTE call request.

17. The one or more non-transitory computer-readable media of claim 16, further comprising:
determining that the recipient call number corresponds to a first recipient device in a first telecommunication network and a second recipient device in a second telecommunication network that is different from the first telecommunications network, the first telecommunication network and the second telecommunication network corresponding to one of the HPLMN, a first VPLMN or a second VPLMN;
retrieving, from the data store, a subscriber account profile associated with the subscriber device, the subscriber account profile including a set of historical communication records conducted over a predetermined time interval; and
analyzing the subscriber account profile to determine whether the recipient call number corresponds to the first recipient device or the second recipient device, and
wherein, determining the country code is further based at least in part on analyzing the subscriber account profile.

18. The one or more non-transitory computer-readable media of claim 16, wherein the predetermined alert threshold is a first predetermined alert threshold and further comprising:
determining that the alert score is greater than or equal to the first predetermined alert threshold and less than a second predetermined alert threshold; and
generating computer-executable instructions for delivery to the subscriber device, the computer-executable instructions to cause the subscriber device to present an alert notification and selectable options to terminate the VoLTE call request or proceed with the VoLTE call request.

19. The one or more non-transitory computer-readable media of claim 16, wherein the alert score is associated with a cost-prohibitive VoLTE communication, and
wherein, a low alert score corresponds to a low unit cost per increment of time.

20. The one or more non-transitory computer-readable media of claim 16, wherein the VPLMN is a first VPLMN, and wherein the adjusted recipient call number is associated with a second VPLMN that is different from the first VPLMN.

* * * * *